US012308138B2

(12) United States Patent
Kusuma et al.

(10) Patent No.: US 12,308,138 B2
(45) Date of Patent: May 20, 2025

(54) MANIFOLD PAIR LAY DATA CABLE

(71) Applicant: Belden Inc., St. Louis, MO (US)

(72) Inventors: Roy Kusuma, Carmel, IN (US); William Thomas Clark, Richmond, IN (US); Alex Chattin, Bedford, IN (US); Caspar Michael Arbeeny, Richmond, IN (US)

(73) Assignee: Belden Inc., St. Louis, MO (US)

( * ) Notice: Subject to any disclaimer, the term of this patent is extended or adjusted under 35 U.S.C. 154(b) by 0 days.

(21) Appl. No.: 18/146,879

(22) Filed: Dec. 27, 2022

(65) Prior Publication Data

US 2023/0215600 A1 Jul. 6, 2023

Related U.S. Application Data

(60) Provisional application No. 63/295,056, filed on Dec. 30, 2021.

(51) Int. Cl.
*H01B 11/04* (2006.01)
*H01B 13/02* (2006.01)

(52) U.S. Cl.
CPC ......... *H01B 11/04* (2013.01); *H01B 13/0221* (2013.01)

(58) Field of Classification Search
CPC ...... H01B 11/04; H01B 7/0876; H01B 11/02; H01B 11/002
See application file for complete search history.

(56) References Cited

U.S. PATENT DOCUMENTS

| | | | | |
|---|---|---|---|---|
| 3,546,357 | A * | 12/1970 | MacPherson et al. | H01B 13/0228 174/34 |
| 7,078,626 | B2 * | 7/2006 | Somers | H01B 11/02 174/113 R |
| 9,601,239 | B2 | 3/2017 | Nordin et al. | |
| 2005/0045367 | A1 | 3/2005 | Somers et al. | |
| 2008/0093106 | A1 | 4/2008 | Lique et al. | |
| 2012/0275122 | A1 * | 11/2012 | Howard | H05K 1/0245 327/564 |
| 2016/0336095 | A1 | 11/2016 | Armbrecht et al. | |

FOREIGN PATENT DOCUMENTS

| | | | |
|---|---|---|---|
| GB | 0 147 264 | A | 7/1920 |
| JP | 06-349344 | * | 12/1994 |
| JP | 2020-017436 | * | 1/2020 |

OTHER PUBLICATIONS

PCT International Search Report and Written Opinion for International Application No. PCT/US2022/054168 mailing date Apr. 19, 2023, 14 pages.

* cited by examiner

*Primary Examiner* — Chau N Nguyen
(74) *Attorney, Agent, or Firm* — Foley & Lardner LLP

(57) ABSTRACT

The present disclosure describes manifold lay lengths for each twisted pair of conductors in a cable comprising at least one twisted pair of insulated conductors, reducing both internal and alien crosstalk. The lay length of each pair can be adjusted, either continuously or in discrete steps, between a shortest lay length and a longest lay length, such that each pair has each lay length at some longitudinal point along the cable. The lay lengths of each pair are staggered in their progression between shortest and longest lay length to avoid pairs having the same lay lengths for any significant length along the cable.

16 Claims, 10 Drawing Sheets

MANIFOLD PAIR LAY DATA CABLE

CROSS-REFERENCE TO RELATED PATENT APPLICATIONS

This application claims the benefit of and priority to U.S. Provisional Patent Application No. 63/295,056 filed Dec. 30, 2021, the entirety of which is incorporated by reference herein.

BACKGROUND

Data cables can include one or more insulated conductors.

SUMMARY

The present disclosure describes apparatuses and methods of manufacture and implementations of shielded (ScTP, F/UTP, FTP) or unshielded twisted pair (UTP) cables, with reduced internal and alien crosstalk, via multiple and distinct lay lengths within each pair across a predetermined range. The lay length of each pair can be adjusted, either continuously or in discrete steps, between a shortest lay length and a longest lay length, such that each pair has each lay length at some longitudinal point along the cable. The lay lengths of each pair are staggered in their progression between shortest and longest lay length to avoid adjacent pairs from having aligned lay lengths for any significant length along the cable.

Twisted pairs can include insulated conductors and/or optical fibers that can be helically twisted amongst itself. For example, a pair of insulated conductors can be orientated in a helical twist and the insulated conductors can have at least one lay length. The lay length can be or include the length of at least one twist of the insulated conductors. The length can be or include a longitudinal distance, region and/or portion. For example, the lay length can be a longitudinal distance along a cable.

At least one aspect is generally directed to a cable. The cable can include at least two insulated conductors. The at least two insulated conductors can be in a helical twist having a lay length of a first value at a first longitudinal position along the cable and a second value at a second longitudinal position along the cable.

At least one aspect is generally directed to a pair of insulated conductors. The pair of insulated conductors can be in a helical twist having a lay length of a first value at a first longitudinal position and a second value at a second longitudinal position.

At least one aspect is generally directed to a method of assembling a pair of insulated conductors. The method can include rotating, along an axis, the pair of insulated conductors at a first speed for a first predetermined amount of time resulting in the pair of insulated conductors having a lay length of a first value along a first longitudinal position. The method can also include rotating, along the axis, the pair of insulated conductors at a second speed for a second predetermined amount of time resulting in the lay length having a second value at a second longitudinal position.

At least one aspect is generally directed to a method of providing a pair of insulated conductors. The method can include providing the pair of insulated conductors. The pair of insulated conductors can be in a helical twist having a lay length of a first value at a first longitudinal position and a second value at a second longitudinal position.

At least one aspect is generally directed to a method of assembling a cable. The method can include disposing, within the cable, a first two insulated conductors, the first two insulated conductors configured in a helical twist, around a central axis of the cable, having a lay length of a first value at a first longitudinal position along the cable, and a second value at a second longitudinal position along the cable. The method can also include disposing, within the cable, a second two insulated conductors, the second two insulated conductors configured in a helical twist, around the central axis of the cable, having a lay length of a first value at the first longitudinal position along the cable and a second value at the second longitudinal position along the cable. The second value of the lay length of the second two insulated conductors can be the same as the first value of the lay length of the first two insulated conductors.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
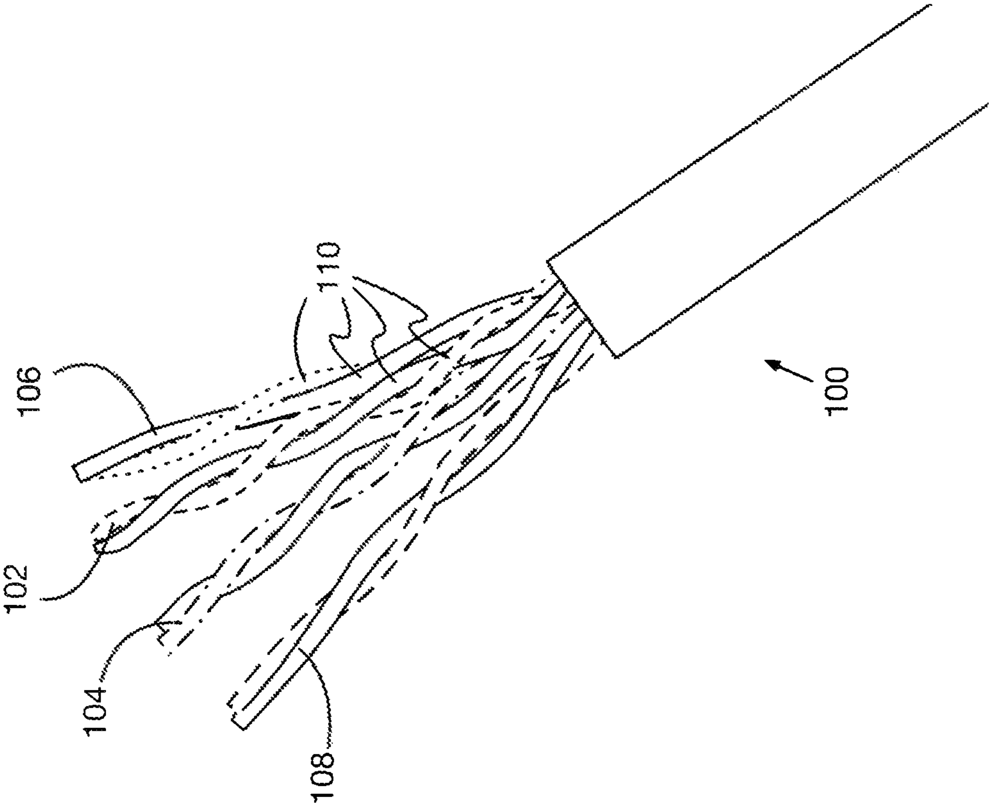
FIG. 1 is an illustration of an unshielded twisted pair (UTP) data cable.

The present application relates to data cables. In particular, the present application relates to data cables with one or more twisted conductors.

High-bandwidth data cable standards established by industry standards organizations including the Telecommunications Industry Association (TIA), International Organization for Standardization (ISO), and the American National Standards Institute (ANSI) such as ANSI/TIA-568-C.2, include performance requirements for cables including Category 5, Category 6, Category 6A, single pair Ethernet cabling, etc. These cables can have strict specifications for maximum crosstalk both internal and external to the cables themselves, amongst other electrical performance parameters. Failure to meet these requirements means that the cable cannot be usable for high data rate communications such as 1000BASE-T (Gigabit Ethernet), 10GBASE-T (10-Gigabit Ethernet), standards pertinent to four pair, single pair and other Ethernet cabling designs and/or other standards.

Near End and Far End Crosstalk is the result of electromagnetic interference (EMI) between adjacent pairs of conductors in a cable, whereby signal flow in a first twisted pair of conductors in a multi-pair cable generates an electromagnetic field that is received by a second twisted pair of conductors in the cable and converted back to an electrical signal. Similarly, alien crosstalk is electromagnetic interference between adjacent cables. In typical installations with a large number of cables following parallel paths from switches and routers through cable ladders and trays, many cables with discrete signals can be in close proximity and parallel for long distances, increasing alien crosstalk. Alien crosstalk is frequently measured via two methods. One of the methods can be power sum alien near end crosstalk (PSANEXT) is a measurement of interference generated in a test cable by a number of surrounding interfering or disturbing cables, typically six, and is measured at the same end of the cable as the interfering transmitter. While six disturbing cables can be used during verification testing, the number of disturbing cables can be more than and/or less than six. Additionally, one of the methods can be power sum alien attenuation to crosstalk ratio, far-end (PSAACRF), which is a ratio of signal attenuation due to resistance and impedance of the conductor pairs, and interference from surrounding disturbing cables.

In an attempt to minimize both internal and alien crosstalk, the twisted pairs of multi-pair data cable can have different rates of twist, sometimes referred as pitch or lay length. For example, one pair can be tightly twisted at a rate of one complete turn or twist over 6 mm; while another pair can be more loosely twisted, at a rate of one complete turn over 15 mm (or any other such lengths). Twist rates are typically selected to be non-harmonically related. However, this adds significant manufacturing complexity as well as affecting electrical performance of the cable: because each pair is twisted at a different rate, the pairs are not all the same length in any given length of cable. For example, a pair of conductors with a given length that are then twisted tightly will have a resulting length that is shorter than if they were twisted loosely. As cables are typically manufactured in very long lengths (e.g. 100 meters, 250 meters, 500 meters, 1000 meters, or any other such lengths), the resulting difference in length between a tightly twisted pair and loosely twisted pair can be substantial. Accordingly, cables cannot be manufactured in a single pass (e.g. individually twisting each pair via a twisting or twinning machine (e.g., a twinner) and then simultaneously bringing the pairs together for final cabling and/or jacketing) without performing additional take-up and pay-off operations at different rates (via buffers or dancers that can be expensive, slow, take up assembly line space, and are potential failure points). Furthermore, any assembly line must run at the speed of the slowest twinning operation (e.g. the tightest twisted pair) which can be quite a bit slower than twinning of the loosest pair (sometimes as much as a 40% difference in speed). Additionally, due to the different lengths, there can be significant signal propagation differences between the pairs, resulting in skew or delay.

FIG. 1 is an illustration of an unshielded twisted pair (UTP) data cable 100. The cable 100 includes four twisted pairs (102-108) of insulated conductors 110. The insulation of each pair of conductors is typically colored differently to distinguish pairs, illustrated with different dotted lines or dashed lines in FIG. 1 for clarity. For example, a first pair 102 can include a blue insulated conductor (shown in short-dashed line) and a white or white/blue striped insulated conductor (shown in solid line). A second pair 104 can include a green insulated conductor (shown in dashed and dotted line) and a white or white/green striped insulated conductor (shown in solid line). A third pair 106 can include an orange insulated conductor (shown in dotted line) and a white or white/orange insulated conductor (shown in solid line). A fourth pair 108 can include a brown insulated conductor (shown in long-dashed line) and a white or white/brown insulated conductor (shown in solid line). These colors can be varied and/or other colors or striping patterns can be used.

Figure 2:
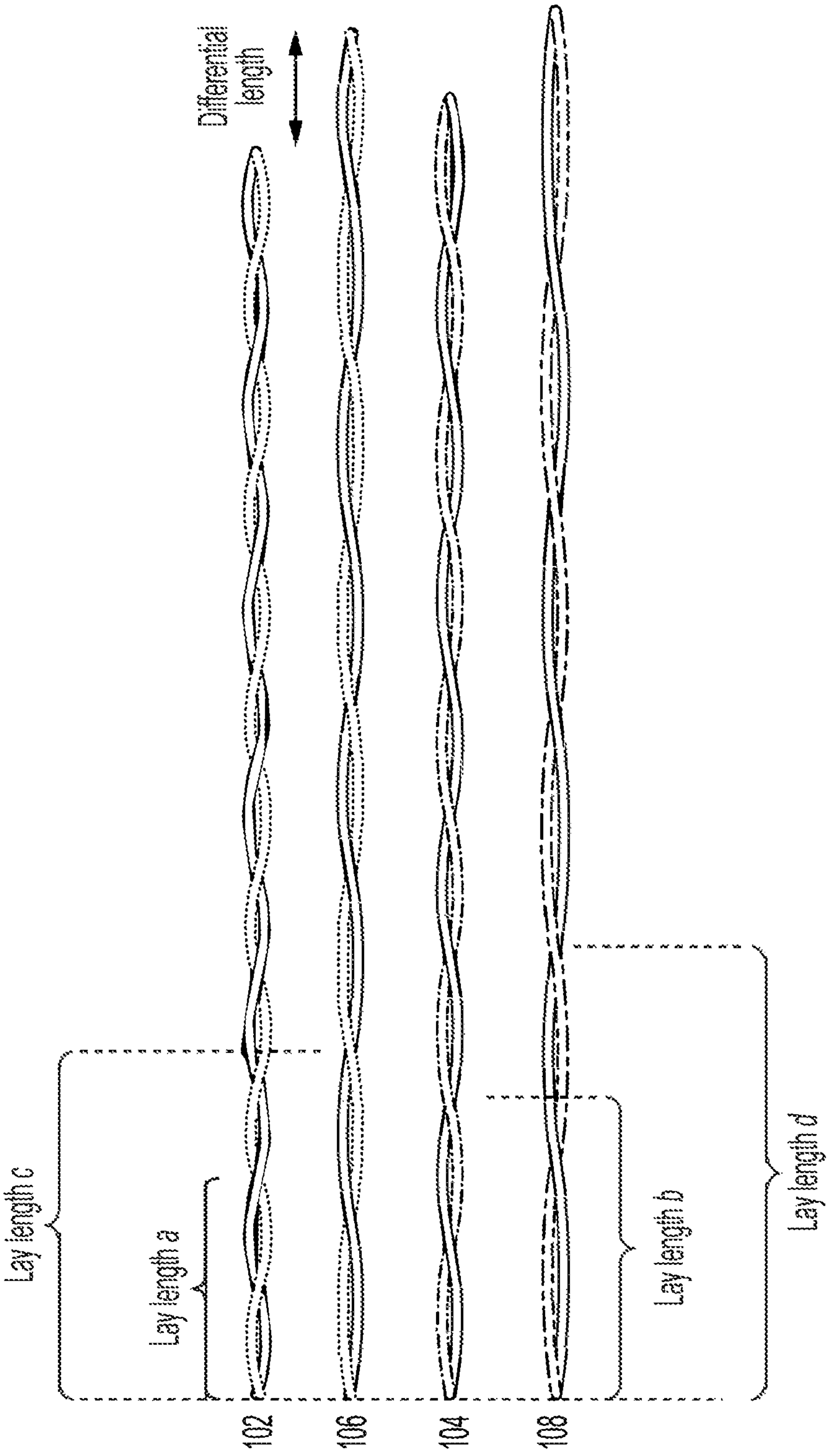
FIG. 2 is an illustration of different lay lengths of twisted pairs for the UTP data cable of FIG. 1.

FIG. 2 is an illustration of different lay lengths of twisted pairs of the UTP data cable of FIG. 1, with the conductor pairs 102-108 shown parallel to each other for comparison purposes. As shown, each conductor pair 102-108 can have a different lay length a-d to avoid regular intervals of coupling between pairs (with differences between each length typically greater than five percent or more). As shown, there can be significant differences in overall length between pairs, resulting in a differential length that is, if untwisted, each conductor in FIG. 2 would be the same length. The tighter twist of pair 102 however results in a shorter overall length relative to the other pairs and particularly relative to the loosest twist of pair 108. As discussed above, this can result in a significant difference in the propagation (or signal) delay between the pairs, resulting in delay skew, impairing performance, and requiring additional signal processing/conditioning at network interfaces.

Although shown separated for comparison purposes in FIG. 2, as shown in FIG. 1, the pairs are in close proximity within the jacket of the cable. To reduce internal crosstalk, adjacent pairs can be selected to have different lay lengths. For example, given four pairs with lay lengths of short, medium-short, medium-long, and long, the medium-short and medium-long pairs can be positioned diagonally across from each other within the cable, slightly increasing their relative distance compared to pairs that are adjacent in the cable. Some attempts to reduce internal crosstalk include adding a conductive or dielectric barrier or separator in the cable between the twisted pairs, though this adds weight, size, and stiffness to the cable, and increases expense of manufacturing. Other efforts include individually shielding each twisted pair with a conductive foil shield (sometimes referred to as foil twisted pair or FTP cables), though this again adds significant size, weight, stiffness, and expense to the cable.

Data cables can be in close proximity to other data cables over long lengths, such as in conduits or ladder racks. For example, a typical conduit in a data center or office building can pack dozens of data cables into a conduit. This can result in alien crosstalk between adjacent cables, particularly those with identical lay lengths, which can be pertinent to single pair Ethernet and/or a multi-pair cable. For example, a first cable with a twisted pair of conductors 102 with lay length a can be placed adjacent and parallel to a second cable with another twisted pair of conductors 102 with lay length a in a conduit for tens or hundreds of meters, separated only by their outer protective jackets. This can result in significant coupling between signals on each pair, impairing performance. Efforts to prevent this coupling include increasing the size or thickness of the jackets, and/or adding foil shields or braids around the twisted pairs (sometimes referred to as shielded twisted pair or STP cables, or shielded foil twisted pair or S/FTP cables), though again, this adds size, weight, stiffness, and expense to the cable. Additionally, foil shields around the pairs can reduce alien crosstalk, but increase internal crosstalk in many instances.

The present disclosure addresses these and other problems in a cost effective manner, without the relatively larger, less flexible, more expensive, and the manufacturing limitation tradeoffs of typical cables. In particular, the cables disclosed herein utilize alternating lay lengths or manifold lay lengths for each twisted pair, reducing both internal and alien crosstalk without requiring fillers or shields. For example, rather than a constant or near-constant lay length for a pair, the lay length can change continuously or discretely between two or more values along the longitudinal length of the cable. A finished cable can incorporate multiple sets and/or pairs of conductors, where different pairs of conductors can have lay lengths that alternate and/or change between a first value and a second value (and/or a third value, fourth value, etc.) anti-synchronously (e.g., with different phases such that different pairs do not have lengths of the same value at any longitudinal position along the cable for no more than a predetermined length along the cable such as two complete twists, one complete twist, or less). This can allow for thinner and lighter cables. Additionally, the cables discussed herein can be less expensive and faster to manufacture, eliminating additional SKUs of different twisted pairs. Furthermore, the cables discussed herein have consistent lengths between each twisted pair over long cable lengths, reducing or eliminating signal delay differentials. The cables can also be manufactured continuously or in a single-pass, without requiring additional dancers or take-up and pay-out reels, allowing for much faster and less expensive manufacture.

To achieve these benefits, the lay length of each pair can be adjusted, either continuously or in discrete steps, between a shortest lay length and a longest lay length, such that each pair has each lay length at some longitudinal point along the cable. The lay lengths of each pair are staggered in their progression between shortest and longest lay length to avoid pairs sharing and/or having a common lay length for any significant length along the cable.

Figure 3A:
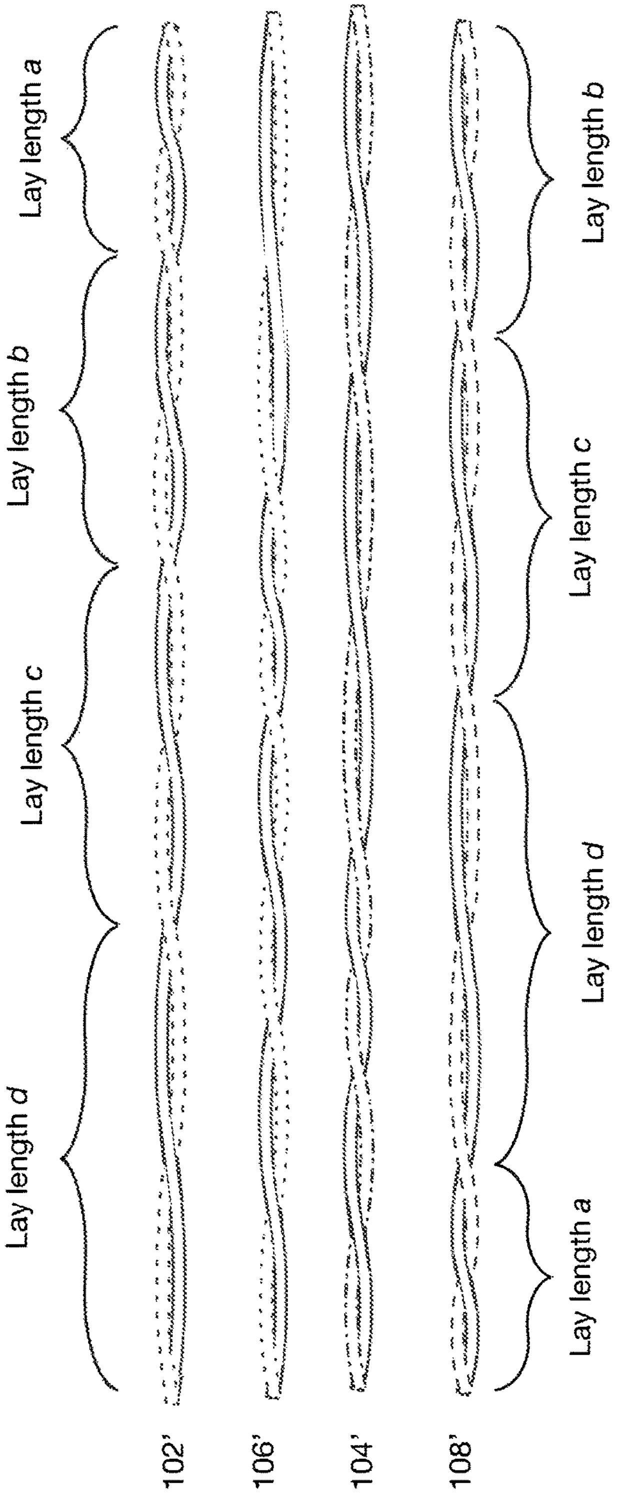
FIG. 3A is an illustration of manifold lay lengths of twisted pairs for an improved UTP data cable.

For example, FIG. 3A is an illustration of manifold lay lengths of twisted pairs of an improved UTP data cable. As shown, each pair 102'-108' can have lay lengths a-d; but at each point along the cable, only one pair has any particular lay length. This is further illustrated in the diagram of FIG. 3B, which symbolically compares the manifold lay lengths of the twisted pairs of FIG. 3A, with each letter representing a corresponding lay length at that position along the cable. These lay lengths a-d can be equal to 0.297", 0.338", 0.449", and 0.510" respectively, or any other such values or range of values.

Figure 3B:
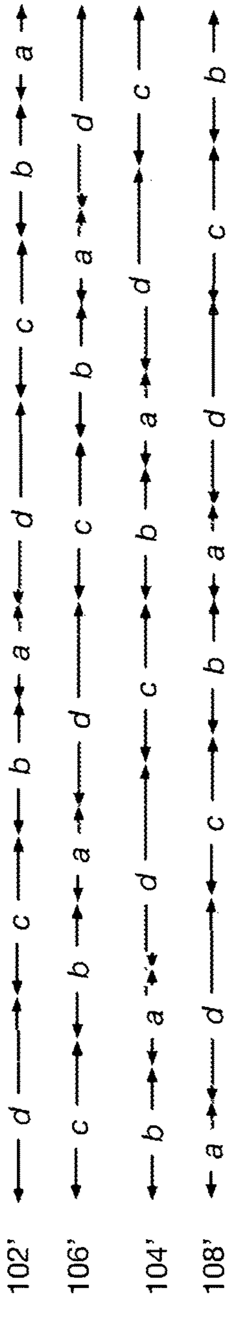
FIG. 3B is a diagram comparing manifold lay lengths between the twisted pairs of FIG. 3A.

As illustrated in FIGS. 3A and 3B, each conductor pair 102'-108' progresses from a longest lay length d to a shortest lay length a, and then repeats. However, each pair starts at a different point in the progression, such that the lengths are staggered. As shown, though, because each pair cycles through the same range of lay lengths, after each iteration, the pairs have the same overall length, reducing or avoiding issues of skew and differential delays.

Furthermore, because each conductor pair varies through the full range of lay lengths, it is highly unlikely that a conductor pair of an adjacent cable would have the same lay lengths at the same points along a run in a ladder rack or conduit. This can significantly reduce coupling between adjacent cables and alien crosstalk, without requiring additional shielding or size increases.

To manufacture the pairs a twinner or twisting machine can be run at a set rotation speed, and the pair can be drawn through the machine faster or slower to create corresponding looser or tighter twists. The draw or take-up speed can be continuously adjusted (providing gradual transitions between the range of lay lengths) or can be discretely adjusted (e.g. by steps, providing fast transitions between lay lengths for each twist). The draw or take-up speed can be constant, and the twinner can be run at different speeds. Other manufacturing methods can also be used.

Although the progression for each conductor pair in FIGS. 3A and 3B is the same (e.g. d to c to b to a to d, etc.), this order can be varied or reversed for one or more pairs. For example, one pair 102' can progress from d to a as shown from left to right along the cable; while a second pair (not illustrated) can instead progress from a to d from left to right along the cable, or have lengths from a to c to b to d or any other order. This can be done by varying the take-up speed during twinning as discussed above.

Figure 4A:
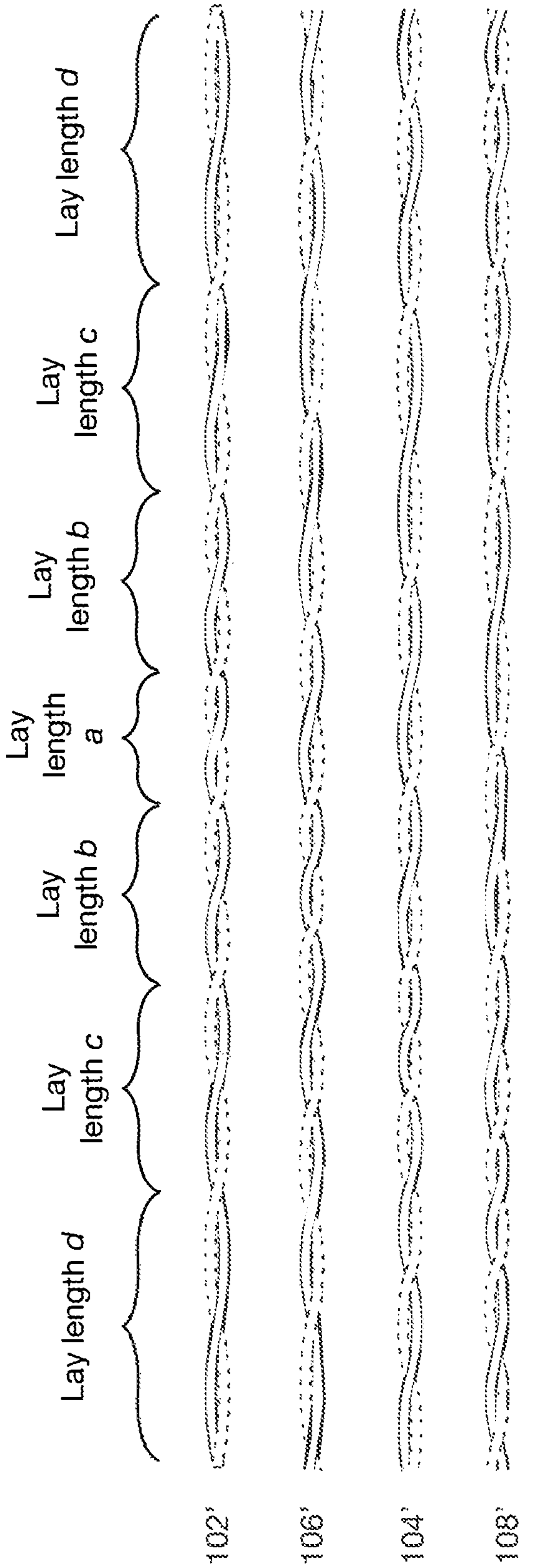
FIG. 4A is another illustration of manifold lay lengths of twisted pairs for an improved UTP data cable.
Figure 4B:
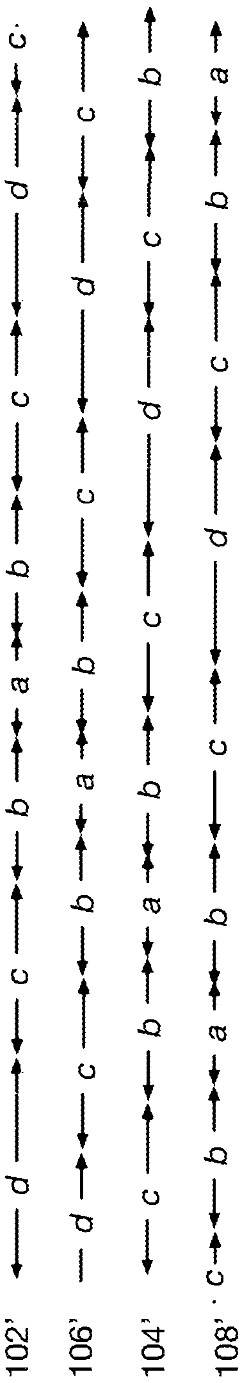
FIG. 4B is a diagram comparing manifold lay lengths between the twisted pairs of FIG. 4A.

FIGS. 3A and 3B depict each pair progressing through lay lengths d-a and repeating. However, the progression can be reversed (e.g. from length d to a and back to d). For example, FIG. 4A is an illustration of manifold lay lengths of twisted pairs of an improved UTP data cable, with each pair being varied from a longest lay length to a shortest lay length and back. FIG. 4B similarly illustrates these relationships symbolically. It can be beneficial to use the manifold lay schema, with lay lengths chosen specifically to minimize general simple and complex periodic effects that can induce return loss artifacts at any frequency of interest. For example, transition points can be located at predetermined locations along the linear and/or longitudinal length of a pair of conductors.

Although discussed with four lay lengths a-d, the number of lay lengths utilize can be a greater or lesser number of discrete lay lengths. For example, FIGS. 4A and 4B in which the lay length is continuously varied between length a and length d can be considered to have two lay length set points representing the extreme ends of this range (e.g. a shortest length and a longest length). Conversely, when the lay lengths are varied in discrete steps, additional set lay lengths can be utilized (e.g. six lay lengths a-f, ten lay lengths a-j, etc.). For example, six lay lengths can include lengths of 0.591", 0.625", 0.710", 0.831", 0.946", and 1.05", or any other such combination of values. As discussed above, the order of these lay lengths for different pairs can be the same or different. Additionally, different conductor pairs can skip different intermediate lay lengths. For example, one pair can have lay lengths a, c, d, and f; while a second pair has lay lengths a, b, e, and f (but staggered to not start at a). The overall length between the pairs can still be the same because each pair still has both the shortest and longest lay lengths as well as intermediate lengths.

Furthermore, although discussed with each conductor pair's lay length being varied a subset of conductor pairs can have fixed lay lengths while other conductor pairs are varied. For example, a first conductor pair can always have a shortest lay length, and a second conductor pair can always have a longest lay length; while third and fourth conductor pairs can be varied between a medium-short and medium-long lay length. This can be useful for cables carrying power in addition to data, such as for use in Power over Ethernet, by utilizing a pair with a longest lay length (and therefore shortest conductor length and lowest resistance) for power.

The cable can only include a single pair of conductors. For example, although primarily discussed above in connection with data cables having four twisted pairs of insulated conductors, these techniques can be used with cables having fewer (or greater) numbers of twisted pairs. A cable can include a single twisted pair of insulated conductors. For example, the twisted pair can be centered in the cable (e.g. sometimes referred to as a twin-axial cable). Although internal crosstalk can be irrelevant, alien crosstalk can be reduced when multiple cables are adjacent (e.g. in a conduit or cable rack or other environment). Additionally, although primarily discussed in connection with pairs of conductors twisted together, these techniques can be used with larger numbers of conductors twisted together (e.g. twisted triplets, twisted quadruplets, etc.).

Additional elements such as barriers or fillers, shields or braids around each pair or around the set of pairs, drain wires, or other such elements can be omitted to reduce the cable size and weight. One or more of these elements can also be included to further increase performance of the cable. For example, alien and internal crosstalk can be reduced further by including shields in addition to utilizing manifold lay lengths.

Figure 5:
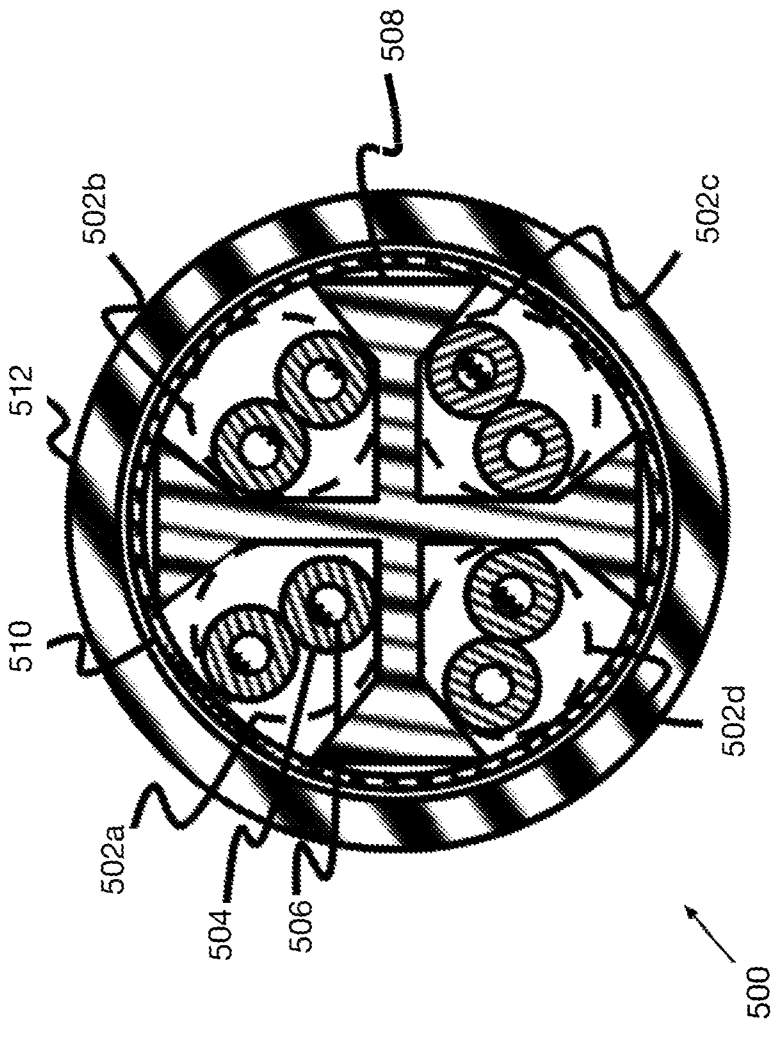
FIG. 5 is a cross section of a UTP cable.

FIG. 5 is an illustration of a cross section of a UTP cable 500. The cable includes a plurality of unshielded twisted pairs 502*a*-502*d* of individual conductors 506 having insulation 504, of which one or more twisted pairs can have manifold lay lengths as discussed above. Conductors 506 can be of any conductive material, such as copper or oxygen-free copper (i.e. having a level of oxygen of 0.001% or less) or any other suitable material, including Ohno Continuous Casting (OCC) copper or silver. Conductor insulation 504 can comprise any type or form of insulation, including fluorinated ethylene propylene (FEP) or polytetrafluoroethylene (PTFE) Teflon®, high density polyethylene (HDPE), low density polyethylene (LDPE), polypropylene (PP), or any other type of low dielectric loss insulation. The insulation around each conductor 506 can have a low dielectric constant (e.g. 1-3) relative to air, reducing capacitance between conductors. The insulation can also have a high dielectric strength, such as 400-4000 V/mil, allowing thinner walls to reduce inductance by reducing the distance between the conductors. Conductors twisted together can be loose (e.g. able to slide relative to one another) or can be bonded together (preventing relative movement), and/or can be partially bonded (e.g. bonded together only in discrete portions of the cable).

Cable 500 can include a separator 508. Separator 508 can be of a non-conductive material such as flame retardant polyethylene (FRPE) or any other such low loss dielectric material. Each pair 502 can be placed within a channel between two arms of the separator 508, said channel sometimes referred to as a groove, void, region, or other similar identifier. The separator 508 can have a cross-shaped cross section, T-shaped cross section, straight or bar cross section, or any other configuration, and can be of any size, depending on the diameter of pairs 502. For example, a cable with an outer diameter of approximately 0.275", the filler can have a terminal portion edge to edge measurement of approximately 0.235".

Cable 500 can include a conductive barrier tape 510 surrounding pairs 502 and the separator. The conductive barrier tape 510 can comprise a continuously conductive tape, a discontinuously conductive tape, a foil, a dielectric material, a combination of a foil and dielectric material, or any other such materials. For example, the barrier tape 510 can comprise a conductive material, such as aluminum foil, located or contained between two layers of a dielectric material such as polyester (PET). Intermediate adhesive layers can be included. A conductive carbon nanotube layer can be used for improved electrical performance and flame resistance with reduced size.

Cable 500 can include a jacket 512 surrounding the barrier tape 510, separator 508, and/or pairs 502. Jacket 512 can be or include any type and form of jacketing material, such as polyvinyl chloride (PVC), fluorinated ethylene propylene (FEP) or polytetrafluoroethylene (PTFE) Teflon®, high density polyethylene (HDPE), low density polyethylene (LDPE), or any other type of jacket material. Jacket 512 can be designed to produce a plenum- or riser-rated cable.

Figure 6:
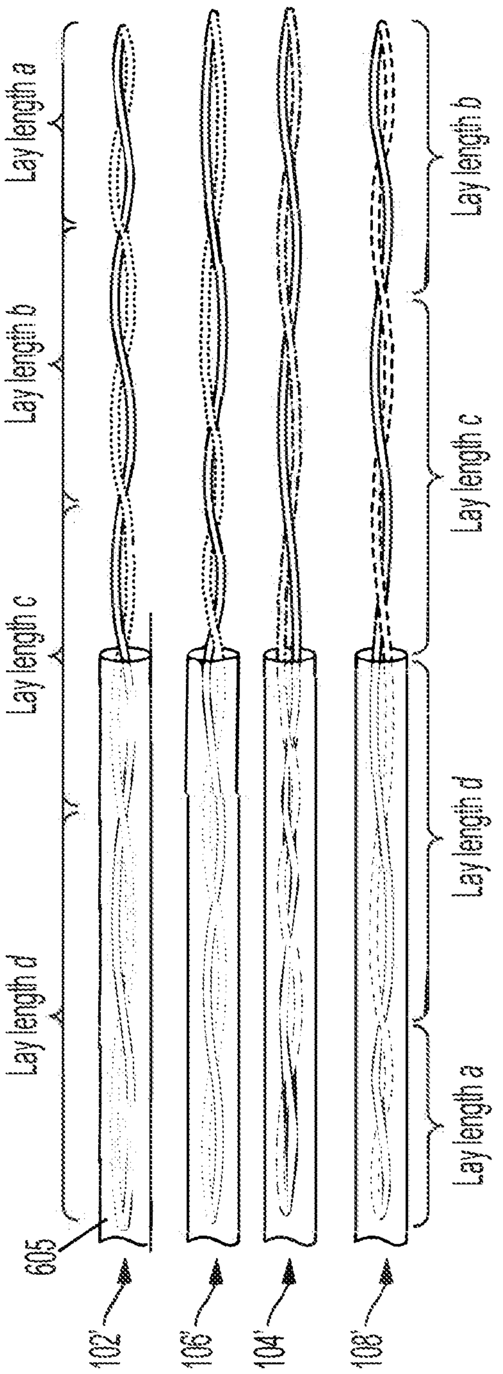
FIG. 6 is an illustration of manifold lay lengths of twisted pairs.

FIG. 6 is an illustration of the twisted pairs 102'-108'. The twisted pairs 102'-108' can each have a manifold lay length. For example, FIG. 6 depicts the twisted pair 102' having the manifold lay length d at a first longitudinal distance, having the manifold lay length c at a second longitudinal distance, having the manifold lay length b at a third longitudinal distance, having the manifold lay length a at a fourth longitudinal distance. At least one of the twisted pairs 102'-108' can be enclosed and/or disposed within a casing 605. The casing 605 can be or include at least one of the cable 500, the jacket 512, conductive foil shield, and/or among other types of enclosures and/or shielding.

At least one of the twisted pairs 102'-108' and the casing 605 can be, include and/or define a cable (e.g., data cable 100 and/or cable 500). For example, the twisted pair 102' and the casing 605 can define a cable. The twisted pair 102' and the casing 605 can be or include a single pair cable. FIG. 6 depicts an example of the twisted pairs 102'-108' each enclosed by a separate casing 605, and an example of the twisted pairs 102'-108' each defining a respective single pair cable. The enclosing of each of the twisted pairs 102'-108' by the casing 605 can reduce cross-talk between the twisted pairs 102'-108'. Furthermore, the alternating of lay lengths, as described herein, amongst the twisted pairs 102'-108' reduces cross-talk between the twisted pairs 102'-108.'

Figure 7A:
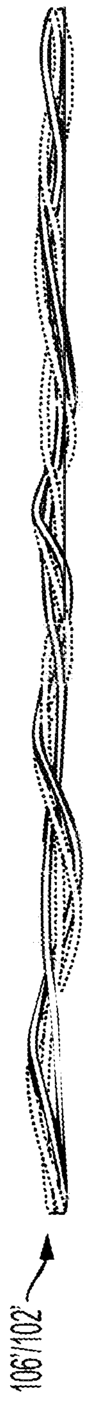
FIG. 7A is an illustration of twisted pairs helically twisted amongst themselves.

FIG. 7A is an illustration of the twisted pairs 102' and 106.' As described herein the twisted pairs 102' and 106' can each have a respective lay length with respect to a longitudinal distance. At least one of the twisted pairs 102' and/or 106' can be twisted, rotated, spun, adjusted and/or otherwise moved around a subsequent twisted pair. For example, the twisted pair 102' can be rotated and/or twisted around the twisted pair 106.' The twisted pair 102' can be rotated around the twisted pair 106' with an alternating lay length. For example, the twisted pair 102' can have a first twist (e.g., a first value of the lay length around the twisted pair 106') at a first longitudinal distance and/or longitudinal position along the twisted pair 106,' and the twisted pair 102' can have a second twist (e.g., a second value of the lay length around the twisted pair 106') at a second longitudinal position along the twisted pair 106.' FIG. 7A depicts an example of the twisted pair 102' twisted around the twisted pair 106,' and an example of the twisted pair 102' having a manifold lay length with respect to the longitudinal position along the twisted pair 106.' The manifold lay length of the twisted pair 102' with respect to the longitudinal position along the twisted pair 106' can avoid the pairs 102' and 106' having a similar lay length, at the same point, for any significant length along the cable.

Figure 7B:
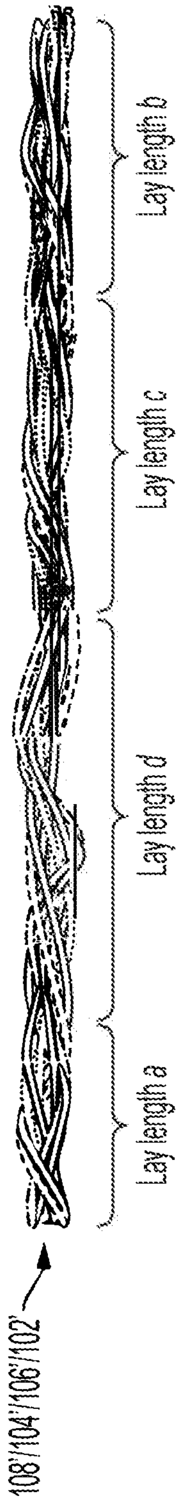
FIG. 7B is an illustration of twisted pairs helically twisted amongst themselves.

FIG. 7B is an illustration of the twisted pairs 102'-108.' The twisted pairs 102'-108' can be twisted amongst each other and each of the twisted pairs 102'-108' can have a manifold lay length with respect to at least one additional twisted pair. For example, the twisted pair 104' can have a manifold lay length with respect to the twisted pair 106.' The manifold lay length of the twisted pair 104' with respect to the twisted pair 106' can be, include, and/or refer to longitudinal points along the twisted pair 106' where the twisted pair 104' is twisted around, and the lay length can adjust at different longitudinal points along the twisted pair 106.' For example, the lay length of the twisted pair 106' can have a first value at a first longitudinal distance along the twisted pair 104,' and the lay length of the twisted pair 106' can have a second value at a second longitudinal distance along the twisted pair 104.' FIG. 7B depicts an example of the twisted pairs 102'-108' twisted amongst one another, and an example of the twisted pairs 102'-108' each having a manifold lay length with respect to at least one additional twisted pair.

Figure 8:
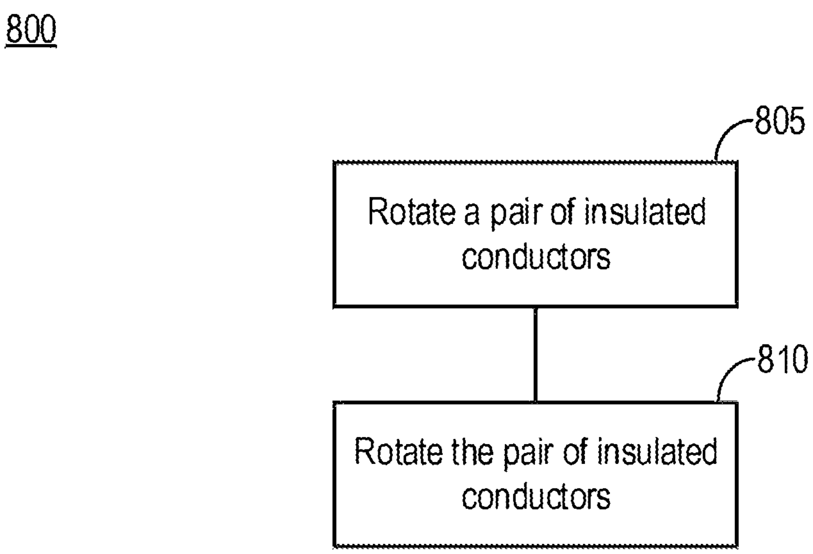
FIG. 8 is a diagram of a process of assembling a pair of insulated conductors.

FIG. 8 is a diagram of a process 800 of assembling a pair of insulated conductors. The pair of insulated conductors can be or include at least one of the twisted pairs 102'-108.' For example, the pair of insulated conductors can be the twisted pair 102.' In ACT 805, the pair of insulated conductors can be rotated. For example, the twisted pair 102' can be rotated by the twinner machine described herein. The twinner can rotate the pair of insulated conductors at a first speed for a first predetermined amount of time. The first speed can be or include at least one of a rotational speed of the pair of insulated conductors around an axis and/or a speed of the twinner. The first predetermined amount of time can be or include how long the twinner rotates the pair of insulated conductors at the first speed. For example, the twinner can rotate the pair of insulated conductors at the first speed for 10 seconds. The rotating of the pair of insulated conductors can result in the pair of insulated conductors having a lay length of a first value along a first longitudinal position. The first longitudinal position can be a longitudinal distance along the pair of insulated conductors.

In ACT 810, the pair of insulated conductors can be rotated. For example, the twisted pair 102' can be rotated by the twinner machine that rotated the pair of insulated conductors in ACT 805 can rotate the pair of insulated conductors again and/or repeatedly. The twinner can rotate the pair of insulated conductors at a second speed for a second predetermined amount of time. The rotating of the pair of insulated conductors, at the second speed for the second predetermined amount of time, can result in the lay length of the pair of insulated conductors having a second value along a second longitudinal position. The second longitudinal position can be a longitudinal distance along the pair of insulated conductors.

The pair of insulated conductors can be rotated, by a twinner, around a second pair of insulated conductors. For example, the pair of insulated conductors rotated in ACTs 805, and 810 can be rotated, by the twinner, around a second pair of insulated conductors. The twisted pairs 102' (e.g., the pair of insulated conductors) can be rotated, by the twinner, around the twisted pair 106.' FIG. 7A, as described herein, depicts an example of the twisted pair 102' having been rotated around the twisted pair 106.' The twisted pair 102' can be rotated, around the twisted pair 106,' at a third speed for a third predetermined amount of time. The rotating of the pair of insulated conductors, at the third speed for the third predetermined amount of time, can result in the lay length of the pair of insulated conductors having the first value at first longitudinal position along the twisted pair 106.' Similarly, the twisted pair 106' can, responsive to the rotating of the twisted pair 102' around the twisted pair 106,' have a lay length of a first value at a first longitudinal distance along the twisted pair 102.'

Figure 9:
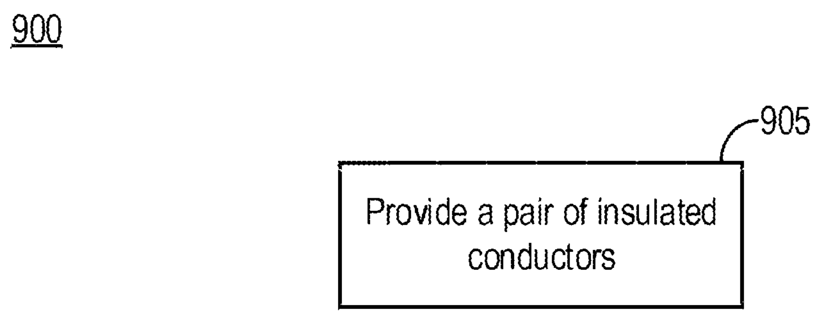
FIG. 9 is a diagram of a process of providing a pair of insulated conductors.

FIG. 9 is a diagram of a process 900 of providing a pair of insulated conductors. In ACT 905 the pair of insulated conductors can be provided. The pair of insulated conductors can be or include at least one of the twisted pairs 102'-108.' For example, the pair of insulated conductors can be the twisted pair 104.' The pair of insulated conductors can be provided to a jobsite. For example, the twisted pair 104' can be placed, located, positioned, revealed or otherwise discovered at the jobsite. The twisted pair 104' can be provided upon the purchasing of the twisted pair 104'. The pair of insulated conductors can be in a helical twist. The helical twist can have a lay length of a first value at a first longitudinal position and a second value at a second longitudinal position. The longitudinal positions can be or include a longitudinal distance along at least one of the pair of insulated conductors, a cable, a jacket, and among other types of shielding and/or enclosures.

Figure 10:
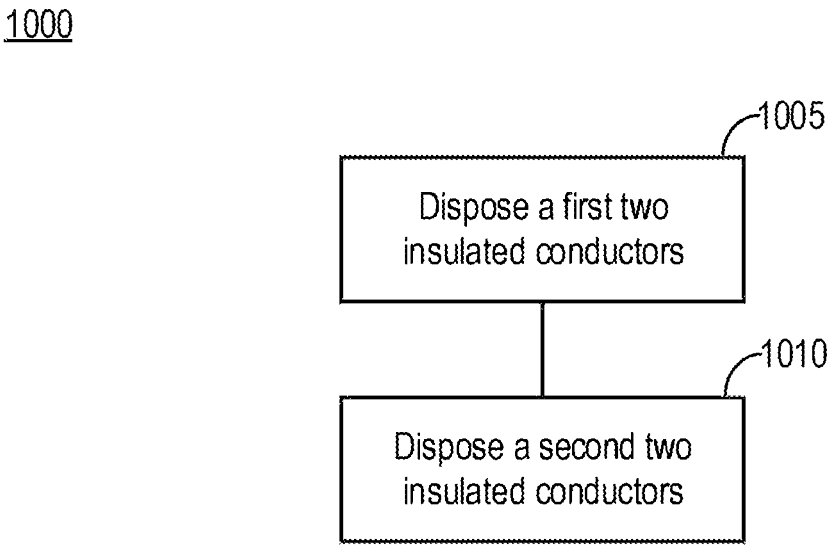
FIG. 10 is a diagram of a process of assembling a cable.

FIG. 10 is a diagram of a process 1000 of assembling a cable. The cable can be and/or include at least one of the cable 100 and/or the cable 500. For example, the cable can be the cable 100. In ACT 1005, a first two insulated conductors can be disposed. The first two insulated conductors can be disposed within a cable. For example, the first two insulated conductors can be disposed within the cable 100. The first two insulated conductors can be disposed within the cable 100 responsive to at least one of placing, positioning, orienting and/or otherwise locating the first two insulated conductors within the cable 100. For example, the first two insulated conductors can be placed within the cable 100 by inserting, the first two insulated conductors, within a channel between two arms of a separator of the cable 100.

The first two insulated conductors can be or include the insulated conductors 110, and the first two insulated conductors can be a pair of insulated conductors. For example, the first two insulated conductors can be the twisted pair 102.' The first two insulated conductors can have and/or include a helical twist around a central axis of the cable 100. For example, the first two insulated conductors can be helically twisted amongst each other. The first two insulated conductors can have a lay length of a first value at a first longitudinal position along the cable 100, and a second value at a second longitudinal positon along the cable. The lay length of the first two insulated conductors can be or include the lay lengths a, b, c, and/or d described herein. For example, the first value of the lay length can be and/or include lay length d, and the second value of the lay length can be and/or include the lay length c.

In ACT 1010, a second two insulated conductors can be disposed. The second two insulated conductors can be disposed within a cable. The second two insulated conductors can be disposed within the same cable to that of the first two insulated cables in ACT 1005. For example, the second two insulated conductors can be disposed within the cable 100. The second two insulated conductors can be disposed within the cable 100 responsive to at least one of placing, positioning, orienting and/or otherwise locating the second two insulated conductors within the cable 100. The second two insulated conductors can be placed within the cable 100 by inserting, the second two insulated conductors, within a second channel between two arms of the separator of the cable 100.

The second two insulated conductors can be or include the insulated conductors 110, and the second two insulated conductors can be a pair of insulated conductors. For example, the second two insulated conductors can be the twisted pair 108.' The second two insulated conductors can have and/or include a helical twist around the central axis of the cable 100. For example, the second two insulated conductors can be helically twisted amongst each other. The second two insulated conductors can have a lay length of a first value at the first longitudinal position along the cable 100, and a second value at the second longitudinal positon along the cable. The lay length of the second two insulated conductors can be or include the lay lengths a, b, c, and/or d described herein. For example, the first value of the lay length can be and/or include lay length a, and the second value of the lay length can be and/or include the lay length d.

The second value, at the second longitudinal position along the cable, of the lay length of the second two insulated conductors, disposed within the cable 100 in ACT 1010, can be the same lay length as the first value, at first longitudinal position along the cable, of the lay length of the first two insulated conductors disposed within the cable 100 in ACT 1005. For example, the second value of the lay length of the second insulated conductors, and the first value of the lay length of the first two insulated conductors can both be the lay length d.

The above description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

What is claimed is:

1. A cable, comprising:

a first pair of insulated conductors configured in a first helical twist, the first helical twist including a first pattern of lay lengths that is repeated along a longitudinal axis of the cable, the first pattern of lay lengths including:

a first lay length that extends from a first longitudinal position along the cable to a second longitudinal position along the cable;

a second lay length that extends from the second longitudinal position along the cable to a third longitudinal position along the cable;

a third lay length that extends from the third longitudinal position along the cable to a fourth longitudinal position along the cable; and a fourth lay length that extends from the fourth longitudinal position along the cable to a fifth longitudinal position along the cable; and a second pair of insulated conductors configured in a second helical twist, the second helical twist including a second pattern of lay lengths that is repeated along the longitudinal axis of the cable, the second pattern of lay lengths including:

the second lay length that extends from the first longitudinal position along the cable to a sixth longitudinal position along the cable;

the third lay length that extends from the sixth longitudinal position along the cable to a seventh longitudinal position along the cable;

the fourth lay length that extends from the seventh longitudinal position along the cable to an eighth longitudinal position along the cable; and the first lay length that extends from the eighth longitudinal position along the cable to the fifth longitudinal position along the cable;

wherein the first lay length, the second lay length, the third lay length, and the fourth lay length include different lengths from one another.

2. The cable of claim 1, wherein the second lay length is at least five percent larger than the first lay length.

3. The cable of claim 1, wherein the first pair of insulated conductors alternates between the first lay length and the second lay length at one or more subsequent longitudinal positions along the cable.

4. The cable of claim 1, comprising:

the second pair of insulated conductors alternating between the third lay length and the fourth lay length at one or more subsequent longitudinal positions along the cable; and the second pair of insulated conductors having, at one or more given longitudinal positions along the cable, lay lengths different than lay lengths of the first pair of insulated conductors.

5. The cable of claim 1, comprising:

the first helical twist of the first pair of insulated conductors including a plurality of twists around an axis of the cable;

the first lay length corresponding to a first twist of the plurality of twists;

the first lay length repeated for a second twist of the plurality of twists; and the second twist of the plurality of twists follows, along the cable, the first twist of the plurality of twists.

6. The cable of claim 1, wherein the first pair of insulated conductors are bonded together.

7. The cable of claim 1, wherein a central axis of the first helical twist of the first pair of insulated conductors is centered within the cable.

8. The cable of claim 1, comprising:

a third pair of insulated conductors configured in a third helical twist, the third helical twist including a third pattern of lay lengths that is different than the first pattern of lay lengths and the second pattern of lay lengths.

9. The cable of claim 1, comprising:

wherein each of the first pair of insulated conductors and the second pair of insulated conductors have a first longitudinal length that is the same with the first pair of insulated conductors in the first helical twist and the second pair of insulated conductors in the second helical twist; and wherein each of the first pair of insulated conductors and the second pair of insulated conductors have a second longitudinal length that is the same with the first pair of insulated conductors untwisted from the first helical twist and the second pair of insulated conductors untwisted from the second helical twist.

10. The cable of claim 1, comprising:

the first pattern of lay lengths to repeatedly alter between the first lay length, the second lay length, the third lay length, and the fourth lay length along the longitudinal axis of the cable; and the pattern of lay lengths including the first lay length that extends from the fifth longitudinal position along the cable to a nineth longitudinal position along the cable.

11. The cable of claim 1, comprising:

a first distance from the first longitudinal position along the cable to the second longitudinal position along the cable is less than a second distance from the first longitudinal position along the cable to the sixth longitudinal position along the cable.

12. The cable of claim 1, comprising:

the first lay length larger than the second lay length; and the second lay length larger than the third lay length.

13. A cable, comprising:

a first pair of insulated conductors configured in a first helical twist, the first helical twist including a first pattern of lay lengths that is repeated along a longitudinal axis of the cable, the first pattern of lay lengths including:

a first lay length that extends from a first longitudinal position of the cable, the first lay length followed by a second lay length;

the second lay length that extends from a second longitudinal position along the cable, the second lay length followed by a third lay length;

the third lay length that extends from a third longitudinal position along the cable, the third lay length followed by a fourth lay length; and the fourth lay length that extends from a fourth longitudinal position along the cable; and a second pair of insulated conductors configured in a second helical twist, the second helical twist including a second pattern of lay lengths that is repeated along the longitudinal axis of the cable, the second pattern of lay lengths including:

the second lay length that extends from the first longitudinal position along the cable, the second lay length followed by the third lay length;

the third lay length that extends from a sixth longitudinal position along the cable, the third lay length followed by the fourth lay length;

the fourth lay length that extends from a seventh longitudinal position along the cable, the fourth lay length followed by the first lay length; and the first lay length that extends from an eighth longitudinal position along the cable;

wherein the first lay length, the second lay length, the third lay length, and the fourth lay length include different lengths from one another.

14. The cable of claim 13, comprising:

a first distance from the first longitudinal position along the cable to the second longitudinal position along the cable is less than a second distance from the first longitudinal position along the cable to the sixth longitudinal position along the cable.

15. The cable of claim 13, comprising:

the first lay length larger than the second lay length; and the second lay length larger than the third lay length.

16. The cable of claim 13, comprising:

the first helical twist of the first pair of insulated conductors including a plurality of twists around an axis of the cable;

the first lay length corresponding to a first twist of the plurality of twists;

the first lay length repeated for a second twist of the plurality of twists; and the second twist of the plurality of twists follows, along the cable, the first twist of the plurality of twists.

* * * * *